United States Patent [19]

Matsumoto et al.

[11] Patent Number: 5,525,285

[45] Date of Patent: Jun. 11, 1996

[54] PROCESS FOR PRODUCING CONCRETE FORM MADE OF THERMOPLASTIC RESIN

[75] Inventors: Masahito Matsumoto, Ibaraki; Takeo Kitayama, Takatsuki; Shigeyoshi Matsubara, Osaka, all of Japan

[73] Assignee: Sumitomo Chemical Company, Limited, Osaka, Japan

[21] Appl. No.: 234,353

[22] Filed: Apr. 28, 1994

[30] Foreign Application Priority Data

Apr. 30, 1993 [JP] Japan ................ 5-103892

[51] Int. Cl.⁶ ............................................. B27N 3/18
[52] U.S. Cl. ................................. 264/319; 264/328.7
[58] Field of Search ........................... 264/328.7, 319

[56] References Cited

U.S. PATENT DOCUMENTS

| | | | |
|---|---|---|---|
| 3,891,179 | 6/1975 | Berman | 249/167 |
| 4,409,169 | 10/1983 | Bartholdsten et al. | 264/107 |
| 5,034,076 | 7/1991 | Masui et al. | 264/257 |
| 5,252,269 | 10/1993 | Hara et al. | 264/328.7 |
| 5,275,776 | 1/1994 | Hara et al. | 264/257 |
| 5,336,463 | 8/1994 | Hara et al. | 264/328.7 |

FOREIGN PATENT DOCUMENTS

| | | |
|---|---|---|
| 047387 | 3/1982 | European Pat. Off. . |
| 439625 | 8/1991 | European Pat. Off. . |
| 2-008459 | 1/1990 | Japan . |
| 1160714 | 8/1969 | United Kingdom . |
| 9409227 | 4/1994 | WIPO . |

OTHER PUBLICATIONS

Patent Abstracts of Japan, vol 11. No. 327 (M–635), Oct. 24, 1987 & JP–A–62 109 618.
Patent Abstracts of Japan, vol. 14, No. 140 (M–950) (4083), Mar. 16, 1990 & JP–A–02 008 459.

*Primary Examiner*—Mark D. Sweet
*Attorney, Agent, or Firm*—Cushman Darby & Cushman

[57] ABSTRACT

A process for producing a concrete form made of thermoplastic resin by a press-molding process by feeding a reinforcing material-containing thermoplastic resin heated to a temperature not lower than the melting temperature of the resin into the cavity between male and female halves of a die, clamping the die and cooling the die, wherein the press-molding is carried out under the conditions that the period of time from completion of feeding the melted resin to completion of clamping is not longer than 6 seconds and flow length L of the fed resin and thickness T of the molded product satisfy the formula $190 \leq L/T$.

13 Claims, 3 Drawing Sheets

FIG. I
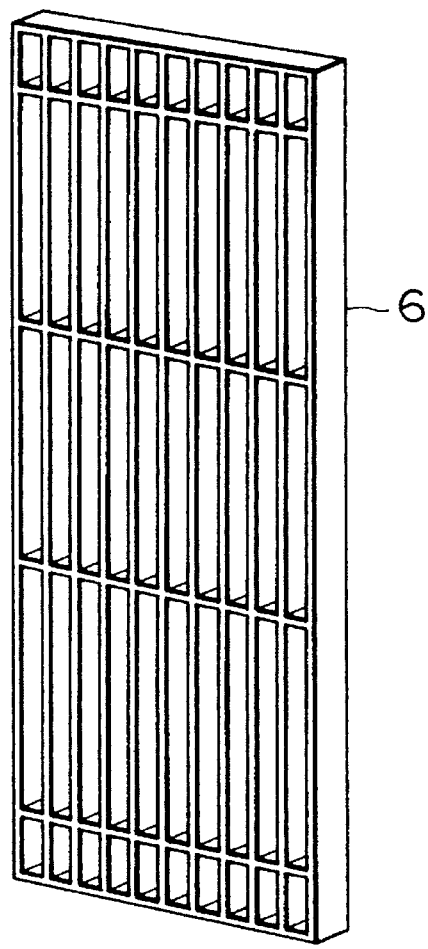
FIG. 2
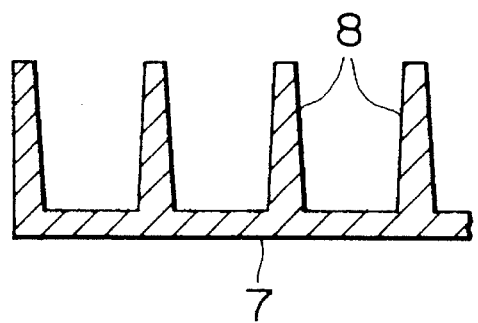

DISTANCE (mm)

TORSION (mm) = b − a

LIFTING (mm) = c

PROCESS FOR PRODUCING CONCRETE FORM MADE OF THERMOPLASTIC RESIN

FIELD OF THE INVENTION

The present invention relates to a process for producing concrete forms made of thermoplastic resin.

RELATED ART STATEMENT

As concrete form, products made of wood have so far been used predominantly. Concrete forms made of wood, however, have a fault that they are heavy in weight and readily wounded. In addition, the problem of earth environment has become important in the recent years. For these reasons, concrete forms made of resins are being developed as substitute for woody ones.

The concrete forms made of resin are produced by, for example, press-molding a thermoplastic resin of which mechanical strengths have been improved by compounding a reinforcing material such as reinforcing fiber, inorganic granular filler or the like. This method of production, however, is disadvantageous in that deformations such as torsion, lifting, etc. appear in the top board which is the broad and flat part of the obtained concrete form.

If such deformations appear, a concrete form becomes quite difficult to handle because of its large size. Further, such deformations exercise adverse influences upon the function of concrete form. For example, the deformations much deteriorate workability of concrete-placing and, in some extreme cases, make the concrete form unusable. Thus, it is an important problem of the time to develop a process for producing a deformation-free concrete form from a thermoplastic resin.

OBJECT AND SUMMARY OF THE INVENTION

In view of above, the present inventors studied a process for producing a concrete form made of thermoplastic resin which is small in the extent of deformation. As a result, it was found that, in the case of press molding process, the molding conditions, namely the period of time from completion of feeding a melted resin to completion of clamping and the relation between flow length L of the fed resin and thickness T of the molded product, exercise a great influence upon deformation of product, and the deforming behavior can be improved when the molding conditions are in specified ranges. Based on this finding, the present invention was accomplished.

Thus, the present invention provides a process for producing a concrete form made of a thermoplastic resin which comprises carrying out a press-molding process by using an open-close type male-female die, feeding a reinforcing material-containing thermoplastic resin heated to a temperature not lower than the melting temperature of the resin into the cavity between the male and female halves of the die in the open state of the die, clamping the die and cooling the die, wherein the press-molding is carried out under molding conditions that the period of time from completion of feeding a melted resin to completion of clamping is not longer than 6 seconds and the ratio of flow length L of the fed resin to thickness of molded product T after the molding satisfies the following condition:

$$190 \leq L/T.$$

BRIEF DESCRIPTION OF THE DRAWINGS

FIG. 1 illustrates one embodiment of the concrete form having a number of ribs on backside from the rib side;

FIG. 2 illustrates a partial sectional view of the concrete form made of thermoplastic resin of FIG. 1;

FIG. 6 illustrates the method for testing lifting of the concrete form made of thermoplastic resin, wherein:

1: reinforcing material-containing melted thermoplastic resin,

2: female half of die,

3: male half of die,

4: resin path,

5: external apparatus for feeding melted resin,

6: concrete form,

7: top board, and

8: rib.

DETAILED DESCRIPTION OF THE INVENTION

The concrete form (6) made of thermoplastic resin produced according to the present invention is not limited in its shape at all. It may be composed only of top board functioning as a contact area with concrete at the time of concrete-placing, or it may also be such a product as shown in FIG. 1 or FIG. 2 in which the ribs (8) are appropriately provided on the backside of top board (7) for the purpose of reinforcement or improving workability. In the latter case, the number, shape and positions of the ribs may be selected arbitrarily.

The press molding process used in the invention is not limited in itself, but processes which are well known so far can be adopted. According to a typical process, an open-close type male-female die designed so as to give a product of prescribed shape, of which female and male halves are denoted by 2 and 3, respectively, is used, and a reinforcing material-containing thermoplastic resin (1) heated and melted at a temperature not lower than its melting temperature is fed into the cavity between both halves of the die in an open state of the die, after which the die is clamped and cooled. Alternatively, the die is clamped and cooled while feeding the resin into the cavity. By these procedures, a desired product is obtained.

Figure 3A:
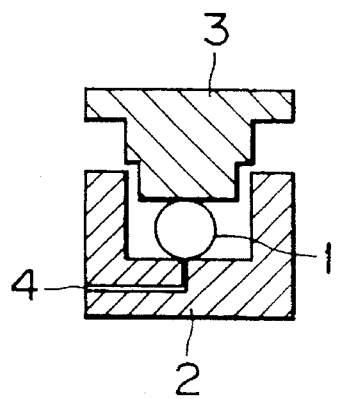
FIGS. 3A to 3C illustrate an outline of the process for producing a concrete form made of thermoplastic resin by injection-press molding process.
Figure 3B:
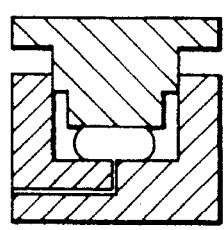
Figure 3C:
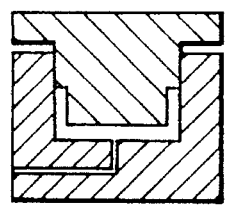
Figure 4A:
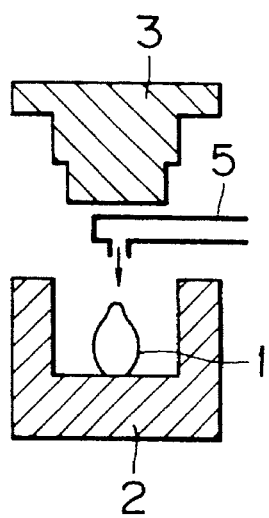
FIGS. 4A to 4C illustrate an outline of the process for producing a concrete form made of thermoplastic resin by casting-press molding process.
Figure 4B:
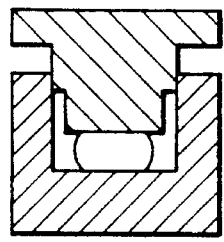
Figure 4C:
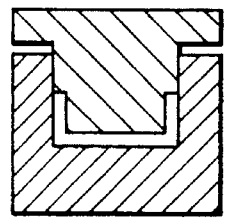

In these procedures, the melted resin may be fed either in such a manner as shown in FIGS. 3A–3C, namely directly into the cavity through a resin path (4) provided in the die which is connected to a plasticizing apparatus (this is injection-press molding process), or in such a manner as shown in FIGS. 4A–4C, namely by using an external feeding apparatus (5) which preliminarily measures out a melted resin and feeds the melted resin into the open die (this is casting-press molding process), and the process of feeding is not particularly limited. The injection-press molding process is preferable to the other, because the period of time from completion of feeding a melted resin to completion of clamping the die is easier to control in the injection-press molding process than in the casting-press molding process.

Essentiality of the present invention consists in carrying out the above-mentioned press molding process under the following molding conditions:

(1) the period of time from completion of feeding a melted resin to completion of clamping the die is not longer than 6 seconds, and (2) the ratio L/T satisfies 190≦L/T, wherein L is flow length of fed resin and T is thickness after molding.

As used in the invention, the term "completion of feeding a melted resin" means the point in time when feeding of a prescribed quantity of melted resin into the cavity between both halves of die in an open state is completed, and the term "completion of clamping" means the point of time when the die has been closed until the cavity clearance reaches a value giving a prescribed thickness of product, not involving the succeeding period for pressure retention.

As for the procedure of feeding a melted resin and clamping the die, it may be achieved by feeding the whole necessary quantity of melted resin at once into the die of which cavity clearance is larger than the final clearance to which the die will be set afterward so as to give the desired thickness of product and thereafter starting the clamping. Alternatively, it may also be achieved by starting the clamping in parallel with the feeding of a melted resin into the cavity of die of which clearance is broader than the final value as has been mentioned above. Actually, any of these procedures may be adopted. In any of these procedures, however, it is necessary that the period of time from completion of feeding a melted resin to completion of clamping (hereinafter, this period of time is referred to as "clamping time") is not longer than 6 seconds.

If the clamping time exceeds 6 seconds, torsion and warping readily occur in the molded product, so that the object of the invention cannot be achieved.

It is further necessary in the invention to carry out the press molding under such molding conditions as to satisfy the following relation:

$$190 \leq L/T$$

wherein L is flow length of fed resin and T is thickness of molded product.

The flow length L and thickness of product T can be measured in the following manner.

Thus, using a press equipped with an open-close type die composed of up and down halves of which cavity surfaces are both planar, 500 g of a melted resin is fed to the nearly central part of the down half as circularly as possible, and thereafter the die is pressed and cooled.

On the circular molded product thus obtained, radius is measured at two or more points separated from one another at equal intervals, and the mean value is taken as flow length L.

On the same circular molded product as above, thickness is measured at two or more points separated from one another at nearly equal intervals and each situated 15 mm inward from the periphery, and the mean value is taken as thickness T.

The ratio L/T thus determined is influenced by molding conditions such as kind of resin material, resin temperature, pressure on the pressed surface at the time of clamping and combinations thereof. In the present invention, the molding conditions are so selected that the L/T ratio determined in the above-mentioned manner comes to 190 or greater.

For example, when the resin material to be used can be specified, resin temperature and pressure on the pressed surface are so regulated that L/T comes to 190 or greater.

Under molding conditions giving an L/T value of smaller than 190, torsion and warping readily occur in the obtained molded product.

In the process of the invention for producing concrete form made of thermoplastic resin, the thermoplastic resin material used as a base material for constituting the concrete form is not critical. Examples of the material usable for this purpose include polyethylene, polypropylene, ABS resin, vinyl chloride resin, PMMA, nylon, polycarbonate resin and the like. Of these materials, particularly preferred are polyolefin resins such as polypropylene and the like.

These thermoplastic resins are impractically low in strength as a concrete form when used alone. Accordingly, they are usually used in the form of compounded mixture with a reinforcing material such as reinforcing fiber, inorganic granular filler, etc.

As examples of the reinforcing fiber used for this purpose, inorganic fibers such as glass fiber, carbon fiber, alumina fiber and the like and organic fibers such as Kevlar® and the like can be referred to. Of these reinforcing fibers, inorganic fibers are preferred and glass fiber is particularly preferred. These reinforcing fibers generally have a fiber length of from about 0.1 mm to about 50 mm, of which those having a longer fiber length are preferable from the viewpoint of improvement in strength. The reinforcing fibers usually have a fiber diameter of from about 1 μm to about 50 μm.

As examples of the inorganic granular filler, a variety of so far known reinforcing fillers including whiskers of potassium titanate and the like, as well as talc, wollastonite and the like, can be referred to. Of these inorganic granular fillers, talc is particularly preferred.

These reinforcing fibers and inorganic granular fillers as reinforcing material may be used either alone or in combination at arbitrary ratio. Although quantity of the reinforcing material varies depending on the kind of reinforcing material itself, it is usually 60% by weight or less, and preferably 50% by weight or less, as expressed in the term of content in thermoplastic resin composition. Although lower limit of the content of reinforcing material is not particularly limited, a sufficient reinforcing effect can be exhibited only when at least 5% by weight, preferably at least 10% by weight, of reinforcing material is used.

According to the process of the invention, a concrete form small in the extents of torsion and lifting can be produced easily.

PREFERRED EMBODIMENTS OF THE INVENTION

Next, the invention is explained in more detail with reference to the following examples. Needless to say, the invention is by no means limited by these examples.

In the examples, the characteristics used for evaluation were measured by the methods mentioned below.

Figure 5:
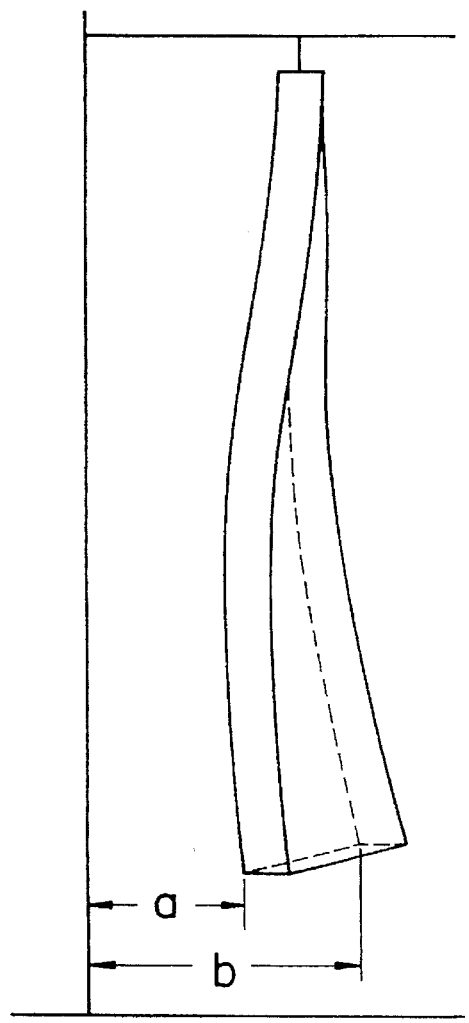
FIG. 5 illustrates the method for testing torsion of the concrete form made of thermoplastic resin.

Torsion: A concrete form is hung in the longitudinal direction with the center of upper shorter side fixed and the whole upper shorter side kept parallel with the hind wall. In this state, the distances from both terminals of the lower shorter side of the hung concrete form to the hind wall are separately measured, and difference between the two distances is taken as torsion (FIG. 5).

When the concrete form is free from torsion, the distances from both terminals of the lower shorter side of concrete form to the hind wall are equal to each other, and the difference between them is zero.

Figure 6:
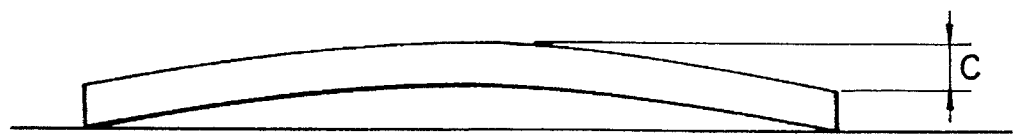

Lifting: A concrete form is placed on a horizontal floor so that the side of the concrete form comes into contact with the floor, and the four corners of the concrete form are forcibly fixed on the floor. In this state, lifting of top board from the horizontal plane is measured (FIG. 6).

EXAMPLE 1

A polypropylene pellet containing 30% by weight of a glass fiber having an average fiber length of 6 mm and a fiber diameter of 13 µm was fed into a plasticizing apparatus. The pellet was heated and melted at 260° C. and homogenized so that glass fiber and polypropylene gave a uniform mixture. The melted material thus obtained was fed into the cavity of male-female die retaining a cavity clearance of 7 mm, through a resin path provided in the female half of the die.

Then, the die was clamped until the cavity clearance between the two halves of the die reached 3.5 mm in the planar part, after which the die was pressed and cooled to obtain a ribbed concrete form made of thermoplastic resin having a length of 1,800 mm and a width of 600 mm.

The molding conditions were as follows.

Pressure on pressed surface: 92.6 kgf/cm$^2$

Clamping speed: 10 mm/sec.

Die temperature: 40° C. in both male and female halves of the die.

The shape of the concrete form thus obtained was as shown in FIG. 1 and FIG. 2. The concrete form had ribs on its back side. Dimensions of the concrete form were as follows:

Thickness of top board: 3.5 mm

Height of rib: 58.5 mm

Rib width at joint to the top: 3.5 mm

Taper angle of rib: 0.5 degree

Thickness as concrete form: 62.0 mm

Number and arrangement of ribs: 11 in the total at equal intervals in the longitudinal direction (involving those present on the two side boards)

6 in the total in the lateral direction (involving those present on both terminals and those present on the lines 150 mm and 650 mm distant from the two side boards).

Table 1 illustrates the results of evaluation of the concrete form made of thermoplastic resin obtained herein, and some other data.

EXAMPLE 2

A concrete form made of thermoplastic resin having the same shape as in Example 1 was prepared by repeating the procedure of Example 1, except that the pressure on the pressed surface was altered to 55.6 kgf/cm$^2$.

Table 1 illustrates the results of evaluation of concrete form made of thermoplastic resin thus obtained and some other data.

EXAMPLE 3

A concrete form made of thermoplastic resin having the same shape as in Example 1 was prepared by repeating the procedure of Example 1, except that a polypropylene pellet containing 15% by weight of a glass fiber having an average fiber length of 6 mm and a fiber diameter of 13 µm and 20% by weight of granular talc having a mean particle diameter of 2.63 µm was used as the raw material.

Table 1 illustrates the results of evaluation of concrete form made of thermoplastic resin thus obtained and some other data.

EXAMPLE 4

A concrete form made of thermoplastic resin having the same shape as in Example 1 was prepared by repeating the procedure of Example 1, except that a polypropylene pellet containing 20% by weight of granular talc having a mean particle diameter of 2.63 µm was used as the raw material.

Table 1 illustrates the results of evaluation of concrete form made of thermoplastic resin thus obtained and some other data.

EXAMPLE 5

A concrete form made of thermoplastic resin having the same shape as in Example 1 was prepared by repeating the procedure of Example 1, except that the cavity clearance at the time of feeding the resin was 10 mm, the clamping was started at a clamping speed of 0.8 mm/sec. simultaneously with start of feeding the resin, and clamping was carried out at a clamping speed of 1 mm/sec. at a pressed surface pressure of 55.6 kgf/cm$^2$ simultaneously with completion of feeding the resin.

Table 1 illustrates the results of evaluation of concrete form made of thermoplastic resin thus obtained and some other data.

Comparative Example 1

A concrete form made of thermoplastic resin having the same shape as in Example 1 was prepared by repeating the procedure of Example 1, except that the conditions of molding were altered as follows:

Cavity clearance at the time of feeding the resin: 10 mm

Pressure on the pressed surface: 37.0 kgf/cm$^2$

Table 1 illustrates the results of evaluation of concrete form made of thermoplastic resin thus obtained and some other data.

Comparative Example 2

A concrete form made of thermoplastic resin having the same shape as in Example 1 was prepared by repeating the procedure of Example 1, except that the conditions of molding were altered as follows:

Cavity clearance at the time of feeding the resin: 20 mm

Clamping speed: 3 mm/sec.

Table 1 illustrates the results of evaluation of concrete form made of thermoplastic resin thus obtained and some other data.

Comparative Example 3

A concrete form made of thermoplastic resin having the same shape as in Example 4 was prepared by repeating the procedure of Example 4, except that the conditions of molding were altered as follows:

Cavity clearance at the time of feeding the resin: 20 mm

Clamping speed: 3 mm/sec.

Table 1 illustrates the results of evaluation of concrete form made of thermoplastic resin thus obtained and some other data.

Comparative Example 4

A concrete form made of thermoplastic resin having the same shape as in Example 3 was prepared by repeating the procedure of Example 3, except that the pressure on the pressed surface was altered to 27.8 kgf/cm².

Table 1 illustrates the results of evaluation of concrete form made of thermoplastic resin thus obtained and some other data.

TABLE 1

| | Content of reinforcing material (% by wt.)* | | Pressure (kgf/cm²) | Press speed (mm/sec) | L/T | Clamping time (sec.) | Torsion (mm) | Lifting (mm) |
|---|---|---|---|---|---|---|---|---|
| | GF | Talc | | | | | | |
| Example | | | | | | | | |
| 1 | 31.2 | — | 92.6 | 10 | 255.3 | 2.1 | 13 | 1 |
| 2 | 30.3 | — | 55.6 | 10 | 195.3 | 2.0 | 25 | 3 |
| 3 | 15.0 | 20.0 | 92.6 | 10 | 261.3 | 2.3 | 17 | 2 |
| 4 | — | 20.0 | 92.6 | 1 | 231.2 | 5.6 | 9 | 3 |
| 5 | 30.3 | — | 55.6 | 0.8 | 211.7 | 1.7 | 11 | 1 |
| Comparative Example | | | | | | | | |
| 1 | 30.8 | — | 37.0 | 10 | 181.1 | 2.3 | 71 | 7 |
| 2 | 32.1 | — | 92.6 | 3 | 221.3 | 8.4 | 112 | 5 |
| 3 | — | 20.0 | 92.6 | 3 | 205.4 | 8.1 | 25 | 13 |
| 4 | 15.0 | 20.0 | 27.8 | 10 | 188.3 | 1.9 | 52 | 12 |

*When the reinforcing material was glass fiber only, its content was determined by combustion method. When the reinforcing material contained talc, the content referred to herein is total quantity of reinforcing materials used for preparation of raw material.

What is claimed is:

1. A process for producing a concrete form made of thermoplastic resin which comprises carrying out a press-molding process by using an open-close type male-female die, feeding a reinforcing material-containing thermoplastic resin heated to a temperature not lower than the melting temperature of the resin into the cavity between the male and female halves of the die which is in an open state, clamping the die and cooling the die, wherein the press-molding is carried out under conditions that the period of time from completion of feeding the melted resin to completion of the clamping is not longer than 6 seconds and flow length L of the fed resin and thickness T of the molded product satisfy the following formula:

$$190 \leq L/T$$

2. A process for producing a concrete form made of thermoplastic resin according to claim 1, wherein said reinforcing material is a reinforcing fiber.

3. A process for producing a concrete form made of thermoplastic resin according to claim 2, wherein said reinforcing fiber is a glass fiber.

4. A process for producing a concrete form made of thermoplastic resin according to claim 1, wherein said reinforcing material is an inorganic granular filler.

5. A process for producing a concrete form made of thermoplastic resin according to claim 4, wherein said inorganic granular filler is talc.

6. A process for producing a concrete form made of thermoplastic resin according to claim 1, wherein said reinforcing material is a reinforcing fiber and an inorganic granular filler.

7. A process for producing a concrete form made of thermoplastic resin according to claim 6, wherein said reinforcing fiber is glass fiber and said inorganic granular filler is talc.

8. A process for producing a concrete form made from thermoplastic resin according to claim 3, wherein said glass fiber has an average fiber length of approximately 6 mm and a fiber diameter of approximately 13 μm, said resin being polypropylene containing approximately 30% by weight of the glass fiber.

9. A process for producing a concrete form made of thermoplastic resin according to claim 8, wherein the step of clamping includes clamping the die at a pressure of approximately 92.6 kgf/cm² and wherein a pressing speed is approximately 10 mm/sec.

10. A process for producing a concrete form made of thermoplastic resin according to claim 8, wherein the step of clamping includes clamping the die at a pressure of approximately 55.6 kgf/cm² and wherein a pressing speed is approximately 10 mm/sec.

11. A process for producing a concrete form made of thermoplastic resin according to claim 6, wherein said reinforcing material is a glass fiber having an average length of approximately 6 mm and a fiber diameter of approximately 13 μm and a granular talc having a mean particle diameter of approximately 2.63 μm, said resin being polypropylene containing approximately 20% by weight of said talc and approximately 15% by weight of said glass fiber.

12. A process for producing a concrete form made of thermoplastic resin according to claim 6, wherein the granular filler is talc having a mean particle diameter of approximately 2.63 μm, said resin being polypropylene containing 20% by weight of said talc.

13. A process for producing a concrete form made of thermoplastic resin according to claim 8, wherein the step of clamping includes clamping the die at a pressure of approximately 55.6 kgf/cm² and wherein a pressing speed is approximately 0.8 mm/sec.

* * * * *